Oct. 21, 1969  D. R. SAND  3,473,636
WATER COOLED FLEXIBLE BRAKE SHOE INCLUDING FRICTION
MATERIALS OF DIFFERENT BRAKING CHARACTERISTICS
Filed April 1, 1968

INVENTOR.
Darrel R. Sand
BY
D. D. McGraw
ATTORNEY

United States Patent Office 3,473,636
Patented Oct. 21, 1969

3,473,636
WATER COOLED FLEXIBLE BRAKE SHOE IN-
CLUDING FRICTION MATERIALS OF DIF-
FERENT BRAKING CHARACTERISTICS
Darrel R. Sand, Plymouth, Mich., assignor to General
Motors Corporation, Detroit, Mich., a corporation of
Delaware
Filed Apr. 1, 1968, Ser. No. 717,595
Int. Cl. F16d 69/00, 65/82, 11/12
U.S. Cl. 188—250                                     2 Claims

ABSTRACT OF THE DISCLOSURE

A brake assembly in which a metallic lining is secured to a center section of a shoe rim and organic lining sections are secured to the edge sections of the rim, so that the organic linings carry the light braking loads and with heavy braking loads the rim edges deflect, allowing the metallic lining to carry the major portion of the braking load. A heat exchange arrangement is provided so that the higher heat levels reached when the metallic lining is operating are kept to lower values by transmission of the heat through the high heat conductivity lining and the shoe center section to the heat exchanger.

The invention relates to a brake assembly and more particularly to a brake shoe arrangement in which a high heat conductivity lining is provided on a shoe center section and softer, lower heat conductivity lining sections are provided on the shoe edge sections. An organic lining material is preferably used on the edge sections and a metallic lining on the center section. A heat exchanger is provided to remove heat from the center section lining through the center portion of the shoe. The heat exchanger is preferably a part of an engine cooling system so that the heat may ultimately be discharged to the atmosphere through the vehicle radiator. The lining material becomes active in stages depending upon the brake loading. For lighter brake loads, the outer lining material engages the drum or disc being braked. For heavier brake loads, the edges of the shoe rim deflect sufficiently to permit the center lining section to become active.

Figure 1:
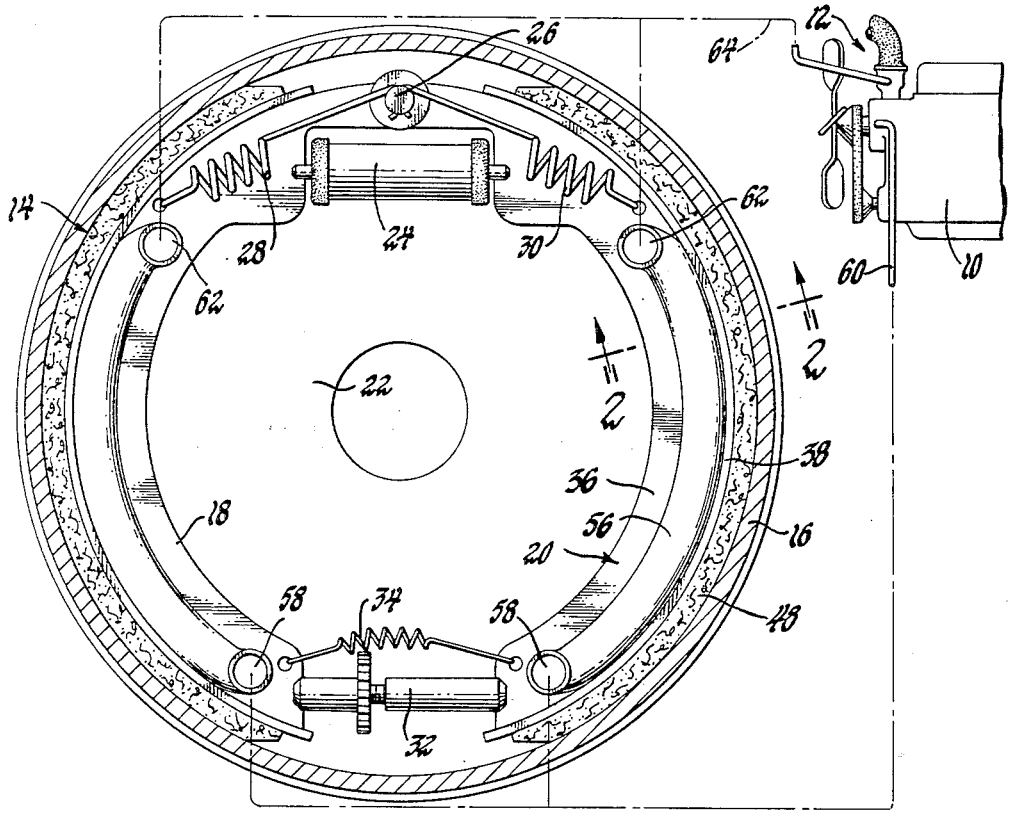
FIGURE 1 is a schematic representation of a system embodying the invention, with the brake assembly being shown in section.
Figure 2:
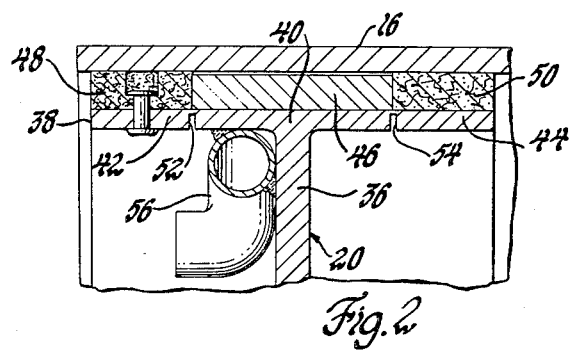
FIGURE 2 is a cross section of the brake assembly of FIGURE 1 taken in the direction of arrows 2—2 of that figure.
Figure 3:
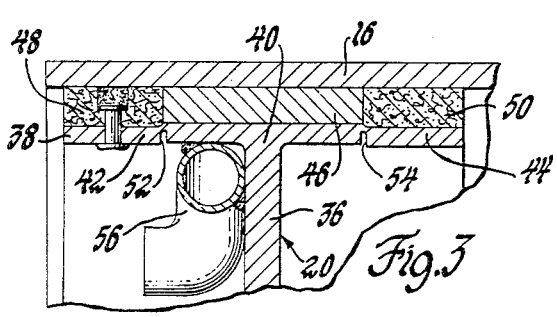
FIGURE 3 is a view similar to FIGURE 2 showing the brake under a heavy brake load condition.

The system shown in FIGURE 1 illustrates the brake assembly embodying the invention as a part of an automotive vehicle in which the engine 10 has an engine cooling system 12 and a brake assembly 14. The brake assembly is illustrated as being of the duo-servo drum type, but also may be of other types, including non-servo drum or disc brake units. The assembly 14 has a rotatable brake drum 16 constituting the member to be braked. The assembly also includes a primary brake shoe 18 and a secondary brake shoe 20. These shoes are movably mounted in a suitable manner on a backing plate 22. The shoe upper ends are spread apart by a wheel cylinder 24 and urged against the anchor pin 26 by the retracting springs 28 and 30. The lower ends of the shoes engage adjusting pin 32 and are held against that pin by spring 34. The construction so far described is conventional in nature.

Since the shoes 18 and 20 are generally similar, only shoe 20 will be described in further detail. The shoe includes a web 36 and a rim 38 secured to the web. Brake lining material is secured to the rim for engagement with the inner surface of the brake drum 16. In the construction embodying the invention, the rim has a center section 40 and edge sections 42 and 44. A first lining material 46 is secured to the rim center section 40 and extends lengthwise of the rim in the direction of relative rotation of the drum 16. Second lining materials 48 and 50 are respectively secured to rim edge sections 42 and 44 and likewise extend lengthwise along the rim in the direction of relative rotation of drum 16. The rim edge sections 42 and 44 are deflectable by the exertion of a braking load urging the lining materials into engagement with the drum 16. The edge sections may be provided with deflection lines 52 and 54 to provide for deflection along the lines separating the rim center section 40 and the rim edge sections 42 and 44. The lining section 46 has characteristics different from those of the lining sections 48 and 50. Section 46 is preferably formed as a metallic lining section, with lining sections 48 and 50 being formed of a suitable organic lining material. The metallic lining section has a higher heat conductivity capability and is in direct heat exchange relation with the rim center section 40. A heat exchanger 56 is secured to the shoe assembly so that it is in heat exchange relation with the rim center section 40 for good heat transmission capability. The particular heat exchanger illustrated is formed as a tube fitting at the intersection of the web 36 and the rim 38. One tube end 58 is connected to a conduit 60 and the other tube end 62 is connected to a conduit 64 so that cooling fluid from the engine cooling system can be circulated through the heat exchanging tube 56. For this purpose conduits 60 and 64 are suitably connected to the engine cooling system 12.

When the brake assembly is operated under light braking loads, lining sections 48 and 50 engage the braking surface of the drum 16 and carry such loads. However, when heavy braking loads are applied the shoe rim edge sections deflect, permitting the lining section 46 to engage a mating portion of the inner surface of drum 16. The lining section 46 then carries the major portion of the braking load as the brake load increases. Due to heavier brake loading, additional heat is generated in the brake assembly, primarily through the frictional engagement of lining section 46 with the drum 16. This heat is removed quickly and efficiently through the heat conductivity path formed by the lining 46, the rim center section 40, the heat exchanger tube 56, and the engine cooling system fluid flowing through the tube and the other portions of the engine cooling system 12. In this manner the advantages of an organic brake lining are achieved during light and medium braking conditions, while the advantages of a metallic lining are utilized during heavy brake load conditions. The brakes are cooled in a manner which removes the heat from the brake area rather than utilizing parts of the brake assembly as a heat sink.

What is claimed is:

1. A brake shoe assembly for frictionally braking a member moving relative thereto and comprising:
   a brake lining mounting member having
      a center section and edge sections extending in the direction of relative movement of the member to be braked,
   a first braking characteristic lining material secured to said edge sections and extending in the direction of relative movement of the member to be braked,
   a second different braking characteristic lining material secured to said center section and extending in the direction of relative movement of the member to be braked,
   said edge sections having deflecting characteristics under braking load such that during light braking effort said first braking characteristic lining material carries the braking load and during heavy braking effort said edge sections deflect to permit engagement of said second different braking characteristic lining material with the member being braked so that the heavy braking load is then carried primarily by the second lining material.

2. The brake shoe assembly of claim 1, further comprising heat exchanger means secured to said center section in heat exchange relation, said second lining material having a substantially higher heat conductivity characteristic than said first lining material so that the heat generated during heavy braking is removed from the lining material through said second lining material and said center section and said heat exchanger means.

References Cited

UNITED STATES PATENTS

| 2,431,774 | 12/1947 | Schumacher | 188—250 |
| 1,758,253 | 5/1930 | Greenwood | 188—251 |
| 2,161,363 | 6/1939 | Malcolm | 188—251 X |
| 2,692,118 | 10/1954 | Holloway. | |

FOREIGN PATENTS 841,817   7/1960   Great Britain.

GEORGE E. A. HALVOSA, Primary Examiner

U.S. Cl. X.R.

188—251, 264; 192—107, 113